United States Patent [19]

Takeda

[11] Patent Number: 5,226,340
[45] Date of Patent: Jul. 13, 1993

[54] ATTACHMENT APPARATUS FOR BICYCLE PARTS WITH IMPROVED CORD FITTING

[75] Inventor: Goro Takeda, Souraku, Japan

[73] Assignee: Cat Eye Co., Ltd., Osaka, Japan

[21] Appl. No.: 837,169

[22] Filed: Feb. 18, 1992

[30] Foreign Application Priority Data

Feb. 18, 1991 [JP] Japan .................. 3-006678[U]

[51] Int. Cl.⁵ .............................................. F16C 1/10
[52] U.S. Cl. .................... 74/551.8; 74/502.4; 74/502.6; 403/331; 403/381
[58] Field of Search ............... 403/331, 381; 24/669; 74/508.4, 502.6, 501.5 R, 502, 503, 551.8

[56] References Cited

U.S. PATENT DOCUMENTS

| | | | |
|---|---|---|---|
| 3,332,117 | 7/1967 | McCarthy | 403/331 |
| 4,620,077 | 10/1986 | Zdanys, Jr. et al. | 403/331 |
| 4,682,513 | 7/1987 | Reeder | 74/502.4 |
| 5,010,781 | 4/1991 | Kirk et al. | 74/502.4 |
| 5,142,935 | 9/1992 | Carr | 74/502.6 |

FOREIGN PATENT DOCUMENTS

| | | | |
|---|---|---|---|
| 3842051 | 12/1989 | Fed. Rep. of Germany | 403/381 |
| 904639 | 8/1962 | United Kingdom | 403/331 |
| 1002943 | 9/1965 | United Kingdom | 403/331 |
| 2224231 | 5/1990 | United Kingdom | 403/331 |

*Primary Examiner*—Vinh T. Luong
*Attorney, Agent, or Firm*—Allegretti & Witcoff, Ltd.

[57] ABSTRACT

An apparatus for attachment of bicycle parts includes: a first attachment part attached to component parts of a bicycle and having a flat projected piece; a second attachment part having a fitting portion slidable with respect to the projected piece and provided for attaching the first attachment part by using the fitting portion and for fixing bicycle parts thereon; and a cord connected through the fitting portion of the second attachment part to the bicycle parts. When the projected piece and the fitting portion are engaged with each other, a portion of the cord is pressed by a tip end of the projected piece, thereby increasing the strength in the cord fitting.

7 Claims, 6 Drawing Sheets

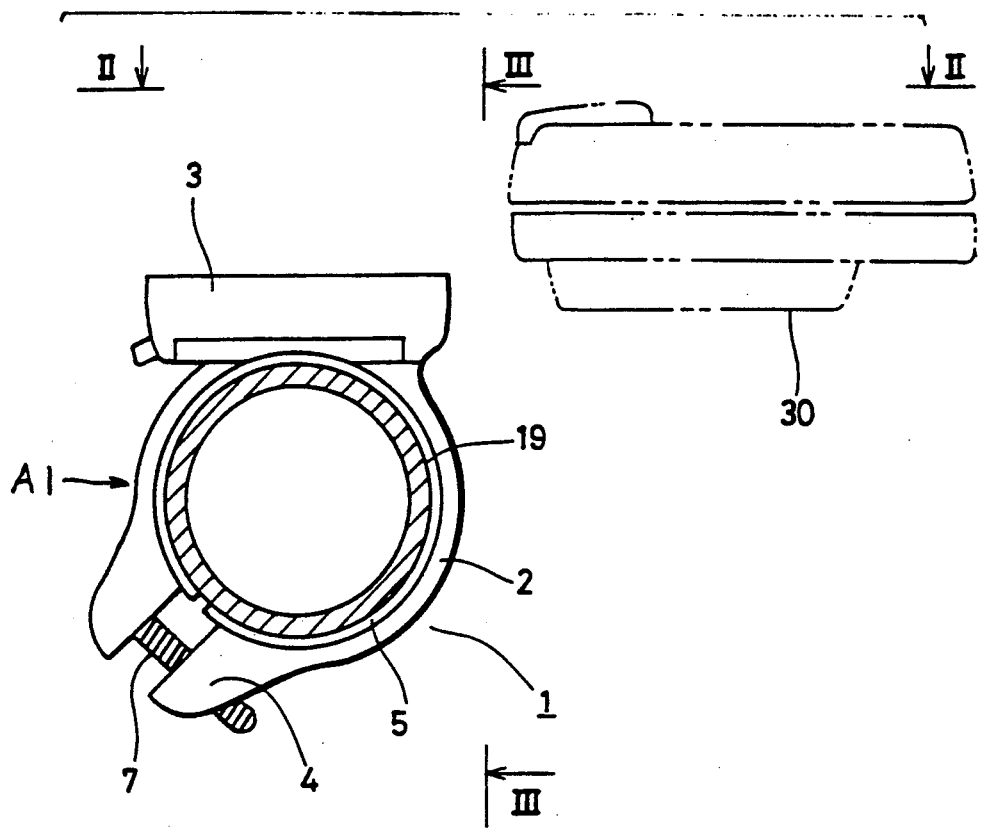
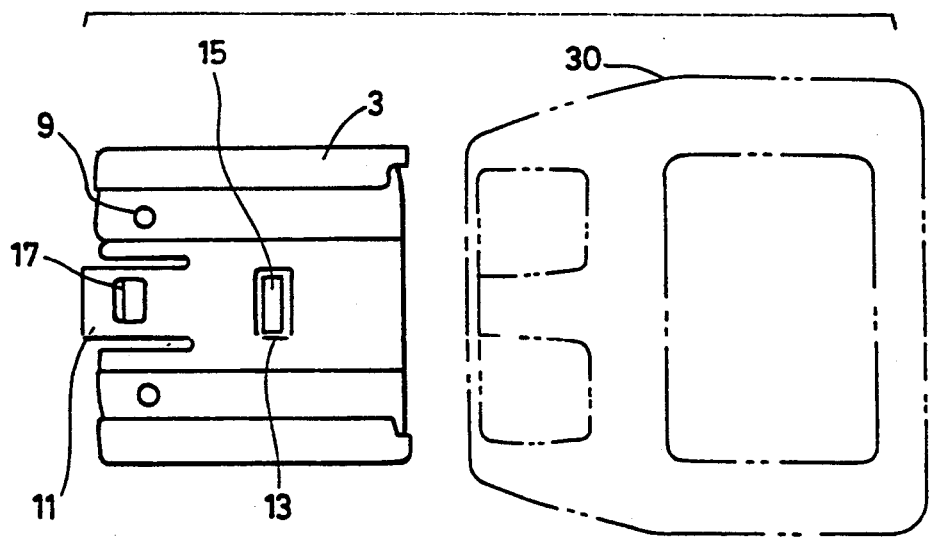

ATTACHMENT APPARATUS FOR BICYCLE PARTS WITH IMPROVED CORD FITTING

BACKGROUND OF THE INVENTION

1. Field of the Invention

The present invention relates to attachment apparatus for bicycle parts and, more particularly, to an attachment apparatus for use in attaching bicycle parts which require connections through cords to bicycles.

2. Description of the Background Art

Recently, speedometers are sometimes attached to bicycles in order to readily know travel speed and travel distance of the bicycles.

FIG. 6 is a side view showing structure of a bicycle to which such a speedometer is attached.

Referring to FIG. 6, a speedometer 30 is detachably attached to a handle 19. A front-wheel fork 32 of the bicycle is provided with a speed sensor 28 for generating one pulse signal every time a magnet 26 attached to a front-wheel spoke passes in front of speed sensor 28. Speedometer 30 and speed sensor 28 are connected through a cord 25 for transmitting generated signals therethrough.

FIG. 7 is an enlarged view of an attachment portion of speedometer 30; and FIG. 8 is a plan view viewed from the line VIII—VIII of attachment parts of FIG. 7.

Referring to FIGS. 7 and 8, an attachment part 37 of speedometer 30 comprises a ring portion A39 which is pivotal on a pin 43, and a ring portion B41. Respective ends of ring portions A39 and B41 are fastened by a screw 49. In attachment, ring portions A39 and B41 are opened to interpose handle 19 therebetween with screw 49 being detached, and screw 49 is fastened with a packing 5 fixed between handle 19 and attachment part 37. Attachment part 37 is thus firmly attached on a desired position of the handle. Ring portion B45 is provided with an engagement portion 45 to be detachably engaged with speedometer 30. On a top surface of engagement portion 45 are provided rivet contacts 47a and 47b for transmitting a signal transmitted through cord 25 from speed sensor 28, with speedometer 30 engaged with engagement portion 45.

FIG. 9 is a cross-sectional view taken along the line IX—IX of FIG. 7.

Referring to FIG. 9, a double groove 46 for engaging with speedometer 30 is provided in engagement portion 45. A recess 48 is formed in a lower surface of engagement portion 45. A base plate 53 is disposed in recess 48. Rivet contacts 47a and 47b provided on the top surface of engagement portion 45 are conducted to base plate 53 via conductors 51a and 51b, respectively. Respective core wires 29a and 29b of cord 25 are connected by soldering to respective conductors 51a and 51b projected from base plate 53. With respective core wires 29a and 29b of cord 25 connected by soldering, polyurethane resin 55 is sealed in recess 48 of engagement portion 45 in order to seal and protect the connecting portion of core wires 29a and 29b from the outside.

In the above-described conventional attachment apparatus for bicycle parts, it is necessary to provide a resin sealing such as by polyurethane resin, and hence, it takes time to manufacture such apparatus. Once the resin sealing is provided, defects occurring in base plate 53 and the connecting portion of core wires 29a and 29b can not readily be inspected or repaired. As a result, the ratio of good quality product (productivity) is decreased.

SUMMARY OF THE INVENTION

One object of the present invention is to provide an attachment apparatus for bicycle parts for readily and securely protecting attachment parts of core wires of a cord from the outside.

Another object of the present invention is to provide an attachment apparatus for bicycle parts capable of facilitating inspections, repairs or the like of a core wire attachment portion of a cord.

To accomplish the foregoing objects, an attachment apparatus for bicycle parts in accordance with the present invention includes: a first attachment part having a flat projected piece and attached to component parts of a bicycle; a second attachment part having a fitting portion which is slidable with respect to the projected piece, provided for attachment of the first attachment part by using the fitting portion and for fixing bicycle parts thereto; and a cord connected through the vicinity of the fitting portion of the second attachment part to the bicycle parts, wherein when the projected piece and the fitting portion are engaged with each other, a portion of the cord is pressed by a tip end of the projected piece.

In the attachment apparatus for bicycle parts thus structured, when the projected piece and the fitting portion are engaged with each other, a portion of the cord is pressed by the tip end of the projected piece. This ensures a cord fitting, and if the engagement is released, the cord is detached, thereby facilitating an inspection of the cord detachment.

The foregoing and other objects, features, aspects and advantages of the present invention will become more apparent from the following detailed description of the present invention when taken in conjunction with the accompanying drawings.

BRIEF DESCRIPTION OF THE DRAWINGS

There is shown in the attached drawing a presently preferred embodiment of the present invention, wherein like numerals in the various views refer to like elements and wherein:

FIG. 1 is a side view showing attachment of an attachment apparatus according to one embodiment of the present invention.

FIG. 2 is a view viewed from the line II—II of FIG. 1.

DESCRIPTION OF THE PREFERRED EMBODIMENTS

FIG. 1 is a side view of an attachment apparatus according to one embodiment of the present invention; FIG. 2 is a view viewed from the line II—II of FIG. 1; and FIG. 3 is a view viewed from the line III—III of FIG. 1.

Figure 3:
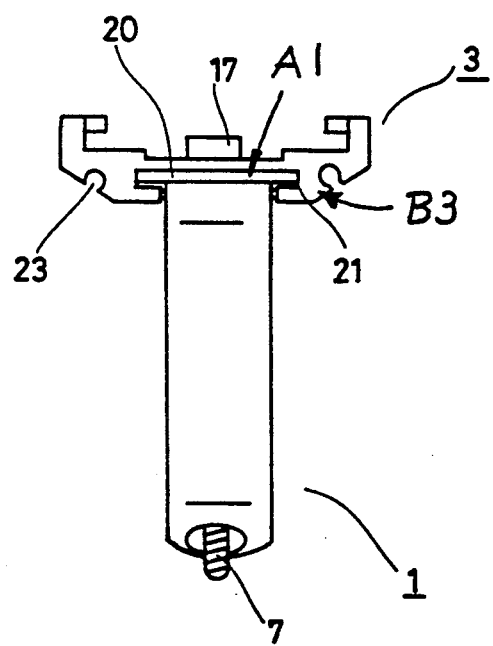
FIG. 3 is a view viewed from the line III—III of FIG. 1.

Referring to FIGS. 1, 2 and 3, an attachment apparatus comprises: an attachment part A1 including an annular ring portion 2 with its end portion opened, and a screw 7 attached to a ring end portion 4 of ring portion 2; and an attachment part B3 being a part to which a speedometer 30 is detachably attached and which is attached to attachment part A1. A flat protrusion 20 is formed on a top surface of attachment part A1 and is slidably engaged with a groove 21 formed in a lower portion of attachment part B3. Protrusion 20 of attachment part A1 engaged with groove 21 is firmly attached to attachment part B3, with a projected portion 15 formed in an upper portion of protrusion 20 being engaged with an opening 13 formed in a lower portion of attachment part B3. An engagement portion 11 which elastically deforms vertically is provided on a lower surface of attachment part B3, and a projected portion 17 is formed on a top surface thereof. When speedometer 30 is slidably attached to attachment part B3, speedometer 30 and attachment part B3 are firmly attached to each other by projected portion 17. Two rivet terminals 9a and 9b for transmitting a signal from a sensor are provided in two places in contact with a lower portion of attachment part B3 when speedometer 30 is engaged with attachment part B3. In the lower portion of attachment part B3, cord through holes 23 for fitting a cord from the speed sensor are each provided on both left and right sides in FIG. 3.

A description will now be made on an operation provided in attaching the attachment apparatus to handle 19. Ring portion 2 of attachment part A1 is formed such as of plastic resin. Detaching screw 7 allows ring end portion 4 to be broadened. With a packing 5 coated on a desired portion of handle 19 with ring end portion 4 broadened, ring portion 2 is attached thereon and screw 7 is fastened. Thus, the opening of ring end portion 4 is narrowed and hence attachment part A1 is firmly attached to handle 19. In this state, attachment part B3, to which the cord from the speed sensor is attached through cord through holes 23, is attached to attachment part A1. Since the attachment of the attachment apparatus is thus completed, attaching speedometer 30 to attachment part B3, if necessary, allows a desired speed display to be made in response to a signal from the speed sensor.

Figure 4:
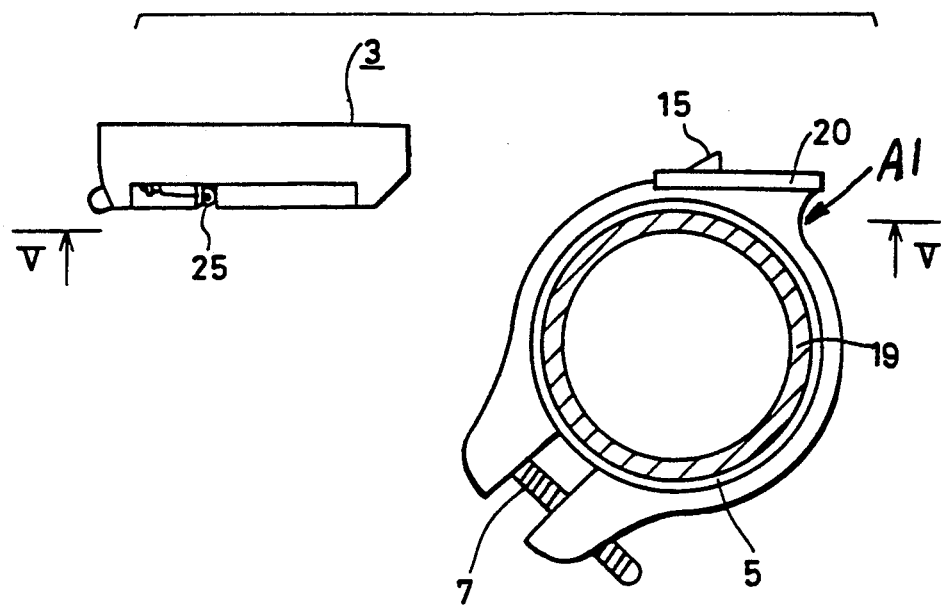
FIG. 4 is a side view showing the state where attachment parts A and B of FIG. 1 are detached from each other.
Figure 5:
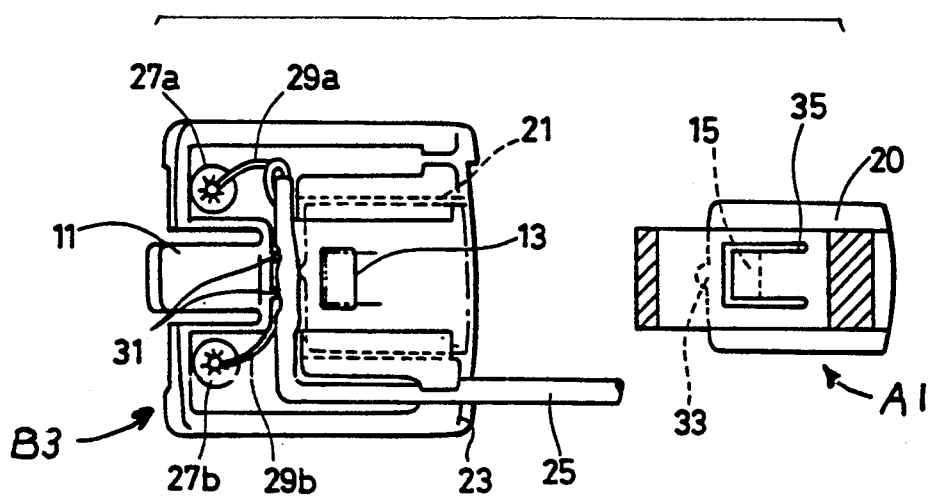
FIG. 5 is a cross-sectional view taken along the line V—V of FIG. 4.
Figure 6:
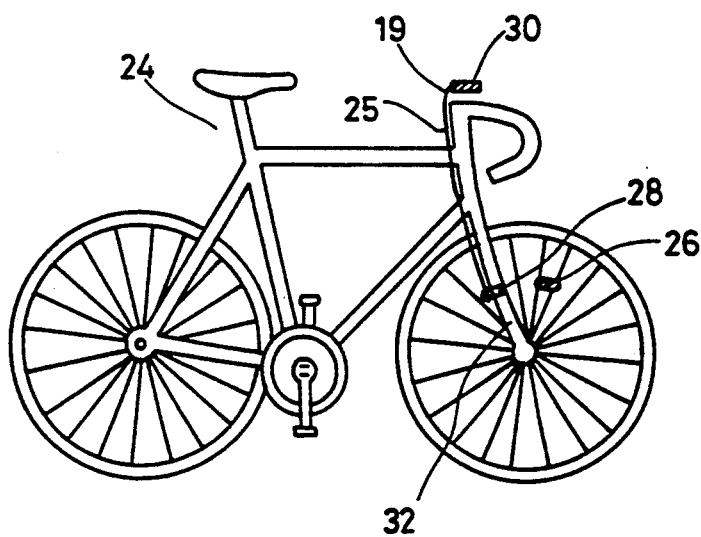
FIG. 6 is a side view of a general bicycle to which a speedometer and a speed sensor are attached.
Figure 7:
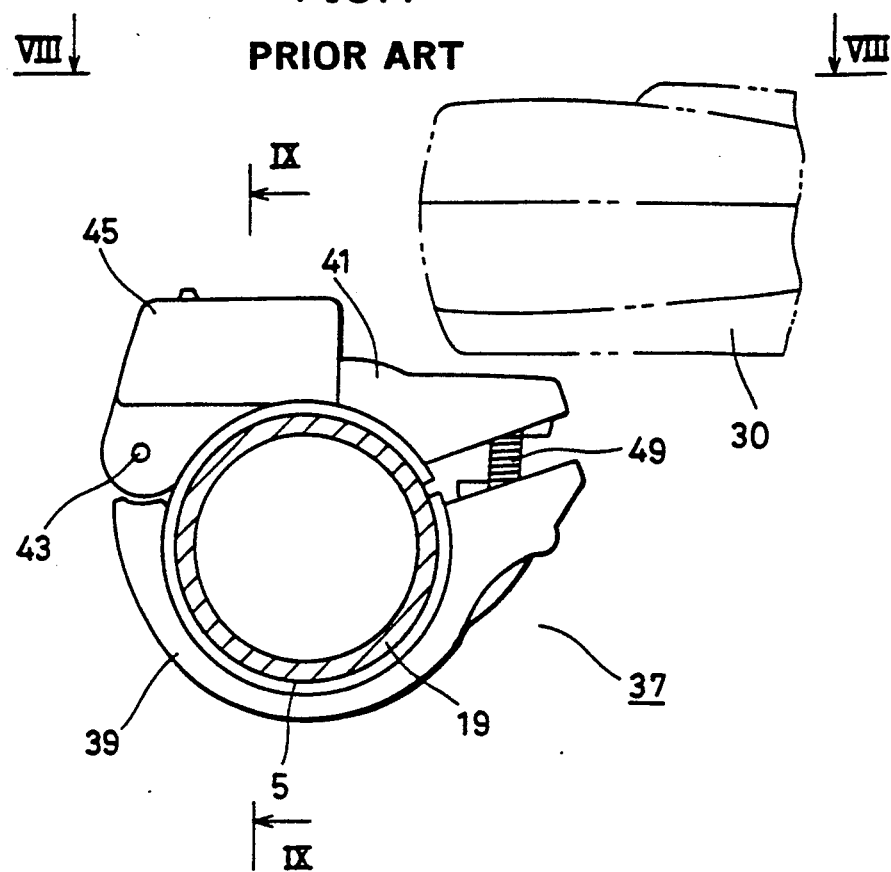
FIG. 7 is a side view showing an attachment state of an attachment apparatus of a conventional speedometer.
Figure 8:
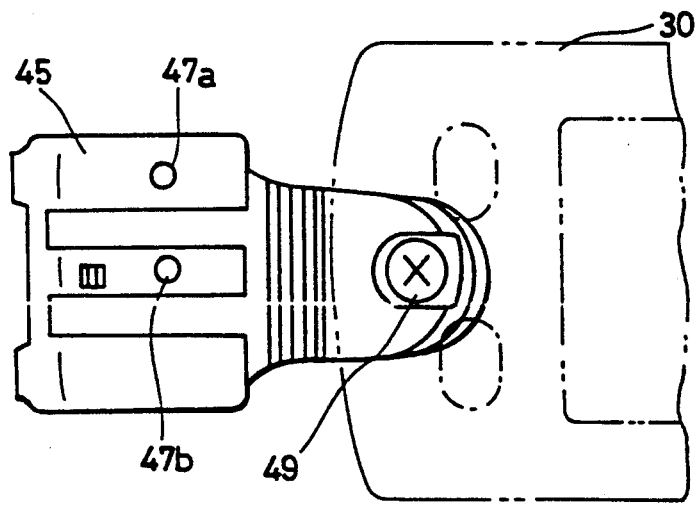
FIG. 8 is a view viewed from the line VIII—VIII of FIG. 7.
Figure 9:
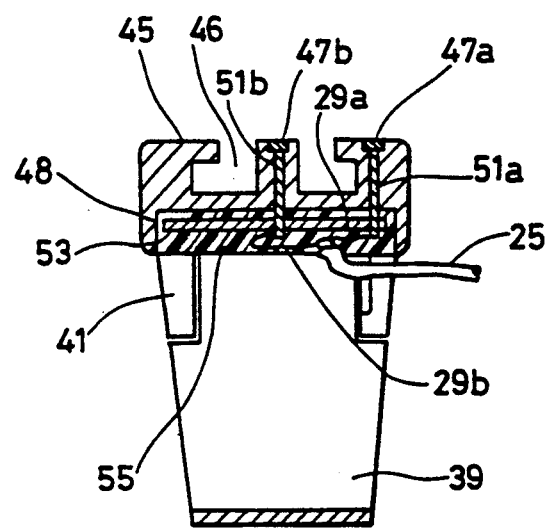
FIG. 9 is a cross-sectional view taken along the line IX—IX of FIG. 7.

FIG. 4 is a side view showing the state where attachment parts A1 and B3 shown in FIG. 1 are detached from each other; and FIG. 5 is a cross-sectional view taken along the line V—V of FIG. 4.

A description will be given mainly on a connecting state of the cord with reference to FIGS. 4 and 5.

A cord 25 introduced from the speed sensor passes through cord through hole 23 and is disposed in a central portion of attachment part B3. Core wires 29a and 29b of cord 25 are each connected by soldering to push nuts 27a and 27b which are attached to conductors connected respectively to rivet terminals 9a and 9b shown in FIG. 2. Two projected portions 31 for pressing cord 25 are provided near the attachment portion of engagement portion 11, in the central portion of attachment part B3. A projected portion 33 is provided on a tip end portion of protrusion 20 formed on the top surface of attachment part A1. A notch 35 is formed in a central portion of protrusion 20, and projected portion 15 that can elastically deform is formed therein.

As shown by broken lines in FIG. 5, when protrusion 20 of attachment part A1 is engaged with groove 21 of attachment part B3, a portion of cord 25 is pressed from both sides by projected portions 31 formed on attachment part B3 and projected portion 33 formed in protrusion 20 of attachment part A1. In this state, since projected portion 15 in protrusion 20 is engaged with opening 13 of attachment part B3, there occurs no decrease in pressure on cord 25 applied by projected portions 31 and 33. Thus, cord 25 is firmly fixed, with attachment parts A1 and B3 being engaged with each other. This prevents an unprepared or undesired fall-off of cord 25. The projected portion 33 on the tip end portion of protrusion 20 and the projected portions 31 formed on attachment part B3 comprise cooperating means for securing the cord 25 in place when the attachment parts A1 and B3 are secured together. The projected portion 15 on attachment part A1 and the opening 13 of attachment part B3 comprise complementary locking means for fixing the attaching parts A1 and B3 to one another in assembled relationship.

Further, unlike the conventional example, since rivet terminals 9a and 9b are provided on the opposite sides of projected portion 17, the distance of push nuts 27a and 27b can be made larger. Accordingly, it is unnecessary to take into account a short-circuit phenomenon in rivet terminals 9a and 9b caused by water drops or the like from the outside, i.e., influences exerted on push nuts 27a and 27b by water drops or the like. It is also unnecessary to carry out resin-sealing by polyurethane resin or the like as in the conventional example. If some defects occur in cord 25 or in the solder-connection of core wires 29a and 29b of cord 25, releasing the engagement of attachment parts A1 and B3 makes it possible to easily detach cord 25 and easily inspect the connecting state of cord 25.

While the disclosed attachment apparatus is applied to bicycle parts of a speedometer in the foregoing embodiment, the apparatus is likewise applicable to other bicycle parts which require a cord connection.

While projected portions are provided respectively on the attachment part A side and the attachment part B side in the foregoing embodiment, the number of such projected portions is not limited, and even if such projected portions are not provided, a sufficient effect of cord fixing is achieved as compared to the conventional example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An attachment apparatus comprising a first attachment part having a projected piece, a second attachment part having groove means for slidably receiving said projected piece for attaching the first attachment part and the second attachment part, a cord, means on the second attachment part for receiving the cord, and cooperating means on the first and second attachment parts for securing the cord, said cooperating means comprising a single projected portion formed on the tip end of said projected piece, and two projected portions formed on opposite sides of said second attachment part at a position corresponding to said first projected portion when said projected piece and said groove means are engaged with each other, and wherein said cord is pressed at three points by said single projected portion and said two projected portions formed on opposite sides of said second attachment part.

2. The attachment apparatus of claim 1 wherein the second attachment part includes means thereon for detachably receiving a speedometer and the first attachment part is adapted to be connected to the handlebar of a bicycle.

3. An attachment apparatus as in claim 1 including complementary locking means on the first attachment part and on the second attachment part for fixing said parts to one another.

4. An attachment apparatus as in claim 1 including means on the second attachment part for receiving a speedometer.

5. An attachment apparatus in claim 1 including means for securing the first attachment part to the handle bar of a bicycle.

6. An attachment apparatus adapted for a bicycle comprising a first attachment part adapted to be secured to the handle bar of said bicycle, said first attachment part including a flat projected piece, a second attachment part having means for slidably receiving said flat projected piece, a cord, means on the second attachment part for receiving the cord, and cooperating means on the first and second attachment parts for securing the cord, said cooperating means comprising a projected portion on the tip end on said flat projected piece and at least one projected portion on the second attachment part, said projected portions pressing on the cord when said projected piece and said means for slidably receiving said flat projected piece are engaged with each other.

7. An attachment apparatus as in claim 6 including complementary locking means on the first attachment part and the second attachment part for fixing the said first attachment part and the said second attachment part to one another.

* * * * *